May 1, 1923.
A. G. FELDMAN
BRACKET
Filed March 31, 1922
1,453,788
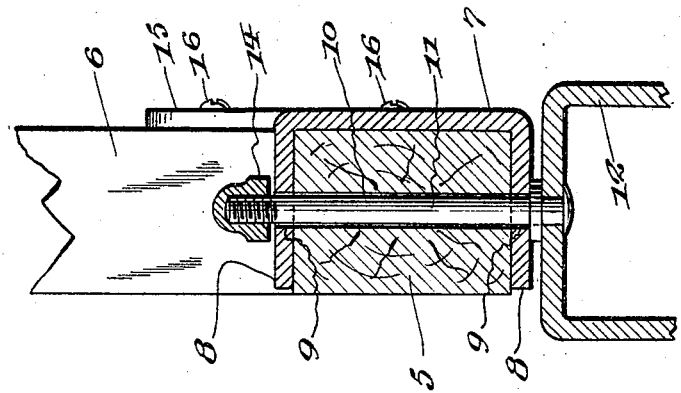
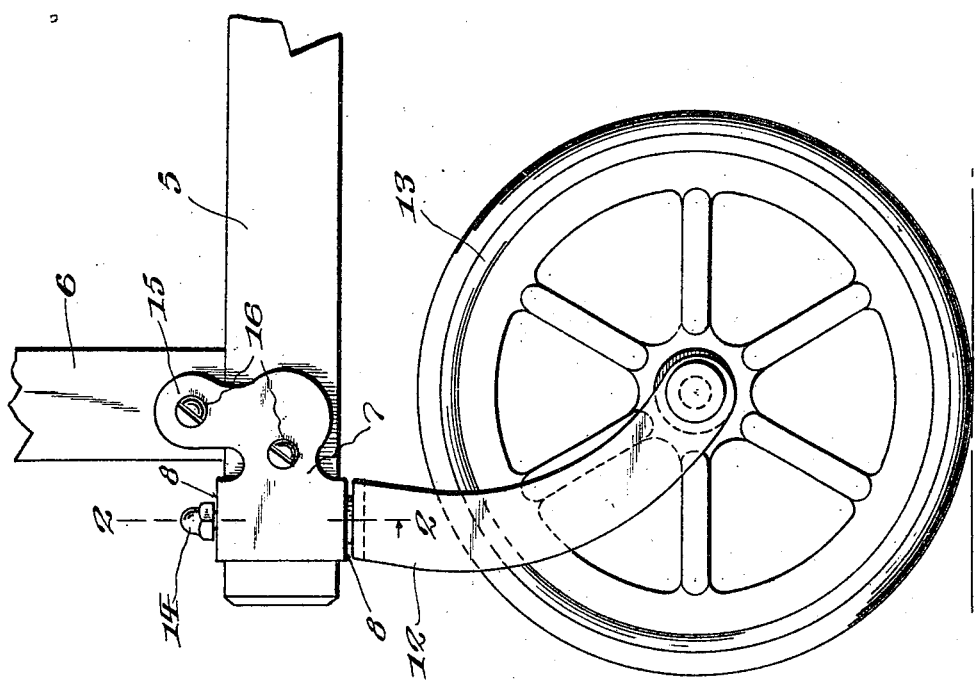
Inventor
Abraham G. Feldman
By
Attorneys.

Patented May 1, 1923.

1,453,788

UNITED STATES PATENT OFFICE.

ABRAHAM G. FELDMAN, OF CHICAGO, ILLINOIS.

BRACKET.

Application filed March 31, 1922. Serial No. 548,510.

*To all whom it may concern:*

Be it known that I, ABRAHAM G. FELDMAN, citizen of the United States, residing at Chicago, in the county of Cook and State of Illinois, have invented new and useful Improvements in Brackets, of which the following is a specification.

My present invention relates to brackets which are adapted to connect angularly disposed members and hold them in fixed relation to each other.

The invention has for its primary object the provision of a bracket of the above-mentioned character having a bearing therein for the reception of a spindle or shank.

Other objects and advantages of the invention will become apparent as the description proceeds, and in order that the same may be better understood, reference is had to the accompanying drawing forming a part of this specification.

In the drawing:

Figure 1 is an elevation of my bracket, shown applied to the lower corner frame of a child's vehicle, and carrying the vertical shank of the wheel fork, and, Fig. 2 is a section on the line 2—2 of Fig. 1.

Referring specifically to the drawing wherein like characters of reference designate like parts throughout, numeral 5 denotes a portion of the lower horizontal bar of the vehicle frame to which a vertical member 6, is connected by means of my bracket 7. This bracket 7 comprises a U-shaped portion having inturned horizontal flanges 8 which are so formed as to hold the horizontal bar 5 therebetween. Alined apertures 9 are formed in said bracket 7 to register with a transverse vertical hole 10, in the bar 5, and through which the revolving stem 11, carrying the fork 12, with the wheel 13, may be inserted and retained by means of a cap-nut 14, on the threaded upper end of said stem.

The vertical post 6 is rigidly held in position by means of an integral offset, upwardly extending flange 15, which is fastened to the members 5 and 6 by screws 16, or in any other preferred manner.

From the foregoing it will be apparent that the bracket 7, not only serves the purpose of connecting the horizontal member 5, and the vertical member 6, but also forms with its apertured flanges 8 and the hole 10, in the horizontal member 5, a bearing for the shank 11 of the wheel fork 12. The shank 11 will be rotatably carried in this bearing and the apertured flanges 8 serve to prevent wabbling or loosening of the shank and also reinforce the wood joint, relieving the same of the strain imparted by the fork. It will also be noted that this stem 11, having been placed in position in its bearing will effectually prevent displacement of the bar 5 from between the flanges 8 thus relieving all strain from the lowermost screw 16, except perhaps a very limited amount arising through possible looseness of the shank 11 in its bearing.

The preferred embodiment of the invention has been disclosed, but it will be understood that various changes and modifications may be made in the same, within the spirit of the invention, the scope of which is set forth in the appended claims.

I claim:

1. In a bracket for connecting two angularly disposed members, the combination of a U-shaped portion for the reception of one of said angularly disposed members the sides of said U-shaped portion and the angularly disposed member enclosed thereby being transversely apertured to form a bearing, a rotatable stem carried in said bearing, said stem preventing displacement of said member from said U-shaped portion, and an integral offset portion carried by said U-shaped portion for securing the other angularly disposed member.

2. In a bracket for connecting two angularly disposed members, the combination of a U-shaped portion for the reception of one of said angularly disposed members, the sides of said U-shaped portion and the angularly disposed member enclosed thereby being transversely apertured to form a bearing, a rotatable stem carried in said bearing, said stem preventing displacement of said member from said U-shaped portion, and engaging means for the other angularly disposed member.

3. In a bracket for connecting two angularly disposed members, the combination of a U-shaped portion for the reception of one of said angularly disposed members, the sides of said U-shaped portion and the angularly disposed member enclosed thereby being transversely apertured to form a bearing, a revolving stem carried in said bearing, and preventing displacement of said member from said U-shaped portion; said stem being bifurcated at one end, a wheel carried in said bifurcated portion, one side of said U-shaped portion forming a bearing surface for said bifurcated portion; and engaging means for the other angularly disposed member.

In testimony whereof I affix my signature.

ABRAHAM G. FELDMAN.